(12) United States Patent
John et al.

(10) Patent No.: US 11,267,049 B2
(45) Date of Patent: Mar. 8, 2022

(54) COMPONENTS

(71) Applicant: Bodycote H.I.P. Limited, Macclesfield (GB)

(72) Inventors: David John, Macclesfield (GB); Susan Davies, Macclesfield (GB)

(73) Assignee: BODYCOTE H.I.P. LIMITED, Macclesfield (GB)

( * ) Notice: Subject to any disclaimer, the term of this patent is extended or adjusted under 35 U.S.C. 154(b) by 259 days.

(21) Appl. No.: 16/614,421

(22) PCT Filed: May 16, 2018

(86) PCT No.: PCT/IB2018/053425
§ 371 (c)(1),
(2) Date: Nov. 18, 2019

(87) PCT Pub. No.: WO2018/211432
PCT Pub. Date: Nov. 22, 2018

(65) Prior Publication Data
US 2020/0198009 A1   Jun. 25, 2020

(30) Foreign Application Priority Data

May 19, 2017   (GB) ..................................... 1708041

(51) Int. Cl.
*B33Y 10/00* (2015.01)
*B33Y 80/00* (2015.01)
(Continued)

(52) U.S. Cl.
CPC ............... *B22F 10/20* (2021.01); *B22F 3/15* (2013.01); *B22F 5/106* (2013.01); *B33Y 10/00* (2014.12); *B33Y 80/00* (2014.12)

(58) Field of Classification Search
CPC .. B22F 10/20; B22F 3/15; B22F 5/106; B22F 7/06; B22F 7/08; B33Y 10/00; B33Y 80/00; B33Y 40/00; Y02P 10/25
See application file for complete search history.

(56) References Cited

U.S. PATENT DOCUMENTS

| | | | | |
|---|---|---|---|---|
| 5,354,414 A | * | 10/1994 | Feygin ................... | B22F 10/20 216/34 |
| 10,702,922 B2 | * | 7/2020 | Berglund ................ | B22F 7/062 |
| 2017/0021423 A1 | * | 1/2017 | Berglund ................ | B22F 10/20 |

FOREIGN PATENT DOCUMENTS

| | | |
|---|---|---|
| CN | 1316891 A | 10/2001 |
| CN | 1902417 A | 1/2007 |

(Continued)

OTHER PUBLICATIONS

Search Report for application No. GB1708041.7; dated Nov. 28, 2017; 3 pages.

(Continued)

*Primary Examiner* — Lawrence Averick
(74) *Attorney, Agent, or Firm* — Shumaker, Loop & Kendrick, LLP

(57) ABSTRACT

An assembly 2 comprises a rigid, self-supporting AM component 4 which is in the form of a T-shaped pipe having an elongate section 6 which is open at its ends 8, 10 and a section 12 which extends transversely to elongate section 6 and opens at its end 13. The component 4 forms internal walls of a capsule which is subjected to Hot Isostatic Pressing (HIP). External walls of the capsule are defined by sheet metal sections (referenced 14 in FIG. 1 and described in more detail with reference to FIGS. 3 to 5) and are arranged to define the outer shape of at least a portion of a final component made by HIP. Between its inner and outer walls a void is defined into which powdered metal 16 is introduced so the capsule encases the powdered metal 16. In (Continued)

use, the assembly is subjected to HIP and, thereafter, the sheet metal sections of the capsule are removed to define a final component comprising both the AM component 4 and HIPed powder 16.

32 Claims, 11 Drawing Sheets

(51) Int. Cl.
   *B22F 10/20*   (2021.01)
   *B22F 3/15*    (2006.01)
   *B22F 5/10*    (2006.01)

(56) References Cited

FOREIGN PATENT DOCUMENTS

| | | |
|---|---|---|
| CN | 101497148 A | 8/2009 |
| CN | 102933337 A | 2/2012 |
| CN | 102444428 A | 5/2012 |
| CN | 105665729 A | 6/2016 |
| CN | 105828987 A | 8/2016 |
| CN | 106660122 A | 5/2017 |
| EP | 2551040 A1 | 1/2013 |
| EP | 3072611 A2 | 9/2016 |
| EP | 3072611 A3 | 10/2016 |
| WO | 2015057761 A1 | 4/2015 |
| WO | 2015150479 A1 | 10/2015 |
| WO | 2015181328 A1 | 12/2015 |
| WO | 2016001368 A1 | 1/2016 |
| WO | 2017112711 A1 | 6/2017 |
| WO | 2018211432 A1 | 11/2018 |

OTHER PUBLICATIONS

International Search Report and Written Opinion for application No. PCT/IB2018/053425; dated Sep. 18, 2018; 12 pages.
Chinese Office Action for Application No. 2018800471364; dated Jul. 15, 2021; 15 pages.
UK Examination Report for Application No. GB1708041.7; dated Mar. 1, 2021; 3 pages.
UK Examination Report for Application No. GB1708041.7; dated Sep. 1, 2020; 2 pages.
UK Examination Report for Application No. GB1708041.7; dated Sep. 30, 2019; 5 pages.
UK Notification of Grant for Application No. GB1708041.7; dated Oct. 19, 2021; 2 pages.
UK Notice of Intention to Grant for Application No. GB1708041.7; dated Sep. 1, 2021; 2 pages.

\* cited by examiner

COMPONENTS

CROSS REFERENCE TO RELATED PATENT APPLICATIONS

This application claims the benefit of and priority to PCT/IB2018/053425 filed May 16, 2018 which claims the benefit of and priority to Great Britain Application No. 1708041.7 filed on May 19, 2017.

TECHNICAL FIELD AND BACKGROUND OF THE INVENTION

The invention relates to components and particularly, although not exclusively, relates to a method of making metallic components and components made in the method per se. Preferred embodiments involve the use of Hot Isostatic Pressing (HIP).

Due to the ever increasing demands to produce complex-shaped components with enhanced properties on selected surfaces (e.g. to increase resistance to corrosion, wear or abrasion) in pumps, pipes, valves, manifolds and general components, in, amongst others, oil and gas, chemical, petrochemical, nuclear and general industrial application, the need to produce multi-metallic components which are suited to meet stringent requirements is increasing. Conventional manufacturing methods including weld overlay, surface coating, mechanical fixings and other cladding techniques are all limited to a line of sight coating or applicable only to a simple internal geometry to allow access for the cladding, weld or mechanical overlay techniques. The problems associated with access to apply these overlay techniques give rise to a high risk of failure of the weld, coating or mechanical bond and result in expensive quality testing, re-machining and re-application of the coating, cladding or mechanical overlay which significantly increases manufacturing costs.

Production of relatively complex shaped components using a mild steel sheet capsule which encapsulates powdered metal, which is then subjected to HIP is an established manufacturing method. In such a method, post HIP removal of the steel capsule is standard practice, resulting in a single homogeneous component to a near net shape configuration. The material properties of the component are uniform throughout. In a number of applications, it may be desirable to include materials of differing characteristics located in defined areas of the component that would benefit from those material characteristics. However, for consistency of manufacture and control of placement of the differing materials, it is difficult to accurately contain different powder materials within the same steel capsule.

It is an object of the present invention to address the above described problems.

BRIEF SUMMARY OF THE INVENTION

According to a first aspect of the invention, there is provided a method of producing a component (herein a "HIPed component"), the method comprising:
(i) selecting an additive manufactured (AM) element;
(ii) constructing a capsule which is arranged to define at least part of said HIPed component, wherein a first region of said capsule is defined, at least in part, by said AM element; and
(iii) subjecting the capsule to HIP.

Said first region of said capsule may be curved or planar. Said first region is preferably curved. Said first region preferably includes a surface which curves through an angle of at least 30°, at least 60°, at least 90°, at least 120°, at least 150° or at least 180°. Said surface of said first region may curve through an angle of at least 270°. Said surface of said first region may curve through an angle of 360°. In this case, said surface of said first region may be circular in cross-section.

Said first region of said capsule preferably defines an internal wall of said capsule. Said first region of said capsule preferably does not include any surface which is part of an outer surface of the capsule—i.e. a surface of the capsule which is exposed to the outside. Said first region is preferably internal to and, more preferably, is fully encapsulated by, other regions of the capsule which regions are suitably not defined by said AM element.

Said first region of said capsule may extend in a first direction. Said first region of said capsule may extend around an elongate axis which extends in said first direction.

Said first region of said capsule may extend around and/or define a void (e.g. inwards of the first region) which may be an elongate void which extends in said first direction.

Preferably, a second region of said capsule is defined, at least in part, by said AM element.

Said second region of said capsule may be curved or planar. Said second region is preferably curved. Said second region preferably includes a surface which curves through an angle of at least 30°, at least 60°, at least 90°, at least 120°, at least 150° or at least 180°. Said surface of said second region may curve through an angle of at least 270°. Said surface of said second region may curve through an angle of 360°. In this case, said surface of said second region may be circular in cross-section.

Said second region of said capsule may define an internal wall of said capsule. Said second region of said capsule preferably does not include any surface which is part of an outer surface of the capsule—i.e. a surface of the capsule which is exposed to the outside. Said second region is preferably internal to and, more preferably, is fully encapsulated by other regions of the capsule which regions are suitably not defined by said AM element.

Said second region of said capsule may extend in a second direction. Said second region of said capsule may extend around an elongate axis which extends in said second direction.

Said second region of said capsule may extend around and/or define a void (e.g. inwards of the second region). Said void may be an elongate void. Said void may extend in said second direction.

Said first and second directions may extend transversely to one another, for example at an angle of at least 20°, at least 60° or at least 85° to one another. In one embodiment, said first and second directions extend at an angle of about 90° to one another.

One or more other regions of said capsule may be defined by said AM element.

Said AM element may define one or more regions of said capsule, for example said first and second regions referred to and, optionally, other regions. The AM element may define a relatively complex shape and/or configuration. It preferably includes an opening, for example a through passage, which suitably extends from a first position on the AM element to a second position on the element. A void is suitably defined between the first and second positions, suitably within the AM element. The AM element may define a plurality of through passages. It may include through passages which extend transversely to one another at least in part. It may include a plurality of voids, for example, in addition to the provision of a void between said first and second positions, it may include a void between third and fourth positions, wherein suitably said third and fourth positions are spaced from said first and second positions.

In said capsule, said AM element preferably does not include any surface which is part of an outer surface of the capsule—i.e. a surface of the capsule which is exposed to the outside. Said AM element is preferably internal to other regions of the capsule which regions are preferably not defined by any part of the AM element. Said AM element is preferably fully encapsulated by other regions of said capsule which are suitably not defined by any part of the AM element.

Said AM element is preferably substantial homogenous. It is preferably made from and/or consists of a single type of material. Said AM element preferably comprises metal which may be an alloy. Said AM element is preferably resistant to etching by acids.

Said AM element may comprise, preferably consist essentially of, a material selected from low alloy steel, austenitic stainless steel, nickel based alloys, Co—Cr, titanium alloys and duplex and super duplex stainless steels.

Said AM element is preferably designed and constructed to be sufficiently strong so it can define part of said capsule as described. It is preferably able to hold a gas tight (e.g. to helium) seal and retain this gas tight membrane during HIP at high temperatures and pressures. Said AM element is preferably made from a weldable material and/or is sufficiently strong that it can be welded to other regions of said capsule which are not defined by said AM element.

Optionally, said AM element may itself contain clad elements through weld overlay, surface coating, mechanical fixings and other techniques to improve its strength and/or characteristics. In one embodiment, the AM product may be a direct product of an AM manufacturing technique, with said AM element requiring minimal or substantially no post-treatment prior to use in the method.

Said AM element selected in step (i) is preferably rigid and self-supporting. Said AM element selected is preferably identical to its form in the HIPed component except that the AM element is HIPed in the method and suitably therefore is densified and subject to shrinkage, for example equi-axis shrinkage. The shape of the AM element is preferably substantially not changed after selection in step (i), other than through being subjected to HIP.

The method may include in step (i) manufacturing the AM element, for example using laser or electron beam welding (EBW), powder bed and wire fed build techniques.

The AM element selected in step (i) may itself be made from a first AM part and a second AM part which are secured together, for example by welding prior to step (i). Alternatively, a first AM part and second AM part may be selected and formed into a capsule in step (ii) along with other capsule elements such as hereinafter described which may not comprise AM elements.

The AM element may be designed and constructed in various sizes based on the build techniques and the possibility to weld more than one AM part together as part of step (i) to construct a larger AM element than is possible to achieve directly from the build techniques. The AM element's maximum size is suitably limited to the maximum size of the overall capsule which may be HIPed.

The AM element, for example for valve parts, may typically represent up to 40% of the total volume of the HIPed component but may be more or less for valve parts and other parts. In preferred embodiments, the AM element may represent 10-60%, for example 10-40% or 20-40% of the total volume of the HIPed component.

Preferably, the AM element if relatively strong and has high corrosion and chemical resistance, and resistance to abrasion or wear.

In step (ii), said method suitably comprises constructing regions of the capsule around said AM element, suitably such that said first region of said capsule is defined by said AM element and optionally, but preferably, said second region of said capsule (when provided) is defined by said AM element. Said method may comprise fully internal enclosing of the AM element. Preferably, said AM element defines an internal wall of the said capsule.

Step (ii) of the method may comprise selecting a capsule element (A) and securing it to (preferably directly to) the AM element. Said capsule element (A) may be arranged to overlie at least part of said AM element. It may be arranged to overlie an extremity of the AM element. It may be arranged to overlie an opening, for example a channel or pipe section, of said AM element. It may be arranged to overlie at least part of the first region of the AM element (when provided). Said capsule element (A) and AM element may be secured together by welding, for example by tungsten inert gas (TIG) welding, Metal Inert Gas (MIG) welding or electronbeam welding. Said capsule element (A) and AM element are preferably secured, for example welded, so that a gas tight (e.g. to helium) seal is defined between the two elements.

Said capsule element (A) may be made from the same material or a different material compared to that of said AM element. Preferably, capsule element (A) is made from a different material compared to that of said AM element.

Said capsule element (A) preferably comprises, more preferably consists essentially of, a metal. Said capsule element (A) may be soluble in a liquid formulation which is contacted subsequently with the combination of AM element and capsule element (A), so that the capsule element (A) can be removed by dissolution. Capsule element (A) may arranged to be sacrificed in the method or may be not removed and left in place. Preferably, however, capsule element (A) is arranged to be sacrificed in the method—that is, it is removed in the method and does not remain in the HIPed component. Said capsule element (A) preferably comprises, more preferably consists essentially of, a metal, for example selected from mild steel, stainless steel, titanium and aluminium.

Said capsule element (A) preferably comprises a sheet material which is secured to the AM element. The sheet material is preferably shaped to define a near net shaped region of the HIPed component. Said capsule element (A), for example said sheet material, preferably has a thickness typically in the range of 2-5 mm, and may have thicker sections to control shape and directional densification.

Step (ii) of the method may include (suitably in addition to selecting capsule element (A)), selection of a capsule element (B) and preferably securing it to (preferably directly to) the AM element. Capsule element (B) may be arranged to overlie an extremity of the AM element. It may be arranged to overlie an opening, for example a channel or pipe section of said AM element. It may be arranged to overlie at least part of the second region of the AM element (when provided). Said capsule element (B) and AM element may be secured together by welding. Said capsule element (B) and AM element are preferably secured, for example welded, so that a gas tight (e.g. to helium) seal is defined between the two elements.

Capsule element (A) and capsule element (B) are preferably spaced apart. They are preferably not contiguous.

Said capsule element (B) may be made from the same material or a different material compared to that of said AM element.

Said capsule element (B) preferably comprises, more preferably consists essentially of, a metal. Said capsule element (B) may be soluble in a liquid formulation which is contacted subsequently with the combination of AM element and capsule element (B), so that the capsule element (B) can be removed by dissolution. Preferably, however, capsule element (B) is arranged to be sacrificed in the method—that is, it is removed in the method and does not remain in the HIPed component. Capsule element (B) may arranged to be sacrificed in the method or may be not removed and left in place.

Said capsule element (B) preferably comprises, more preferably consists essentially of, a metal, for example selected from mild steel, stainless steel, titanium and aluminium.

Said capsule element (B) preferably comprises a sheet material which is secured to the AM element. The sheet material is preferably shaped to define a near net shaped region of the HIPed component. Said capsule element (B), for example said sheet material, preferably has a thickness typically in the range of 2-5 mm, and may have thicker sections to control shape and directional densification.

Step (ii) of the method may include (suitably in addition to selecting capsule element (A) and capsule element (B)), selection of a capsule element (C) and preferably securing it to (preferably directly to) the AM element. Capsule element (C) may be arranged to overlie an extremity of the AM element. It may be arranged to overlie an opening, for example a channel or pipe section of said AM element. It may be arranged to overlie at least part of a third region of the AM element. Said capsule element (C) and AM element may be secured together by welding. Said capsule element (C) and AM element are preferably secured, for example welded, so that a gas tight (e.g. to helium) seal is defined between the two elements.

Capsule element (C) is preferably spaced apart from both capsule element (A) and capsule element (B).

Said capsule element (C) may be made from the same material or a different material compared to that of said AM element. Preferably, capsule element (C) is made from a different material compared to that of said AM element.

Said capsule element (C) preferably comprises, more preferably consists essentially of, a metal. Said capsule element (C) may be soluble in a liquid formulation which is contacted subsequently with the combination of AM element and capsule element (C), so that the capsule element (C) can be removed by dissolution. Capsule element (C) may arranged to be sacrificed in the method or may be not removed and left in place. Preferably, however, capsule element (C) is arranged to be sacrificed in the method—that is, it is removed in the method and does not remain in the HIPed component.

Said capsule element (C) preferably comprises, more preferably consists essentially of a metal, for example selected from mild steel, stainless steel, titanium and aluminium.

Said capsule element (C) preferably comprises a sheet material which is secured to the AM element. The sheet material is preferably shaped to define a near net shaped region of the HIPed component. Said capsule element (C), for example said sheet material, preferably has a thickness typically in the range of 2-5 mm, and may have thicker sections to control shape and directional densification.

Step (ii) of the method may include (suitably in addition to selecting capsule element (A), optionally, capsule element (B) and, optionally, capsule element (C)), selection of a capsule element (D) and preferably securing it relative to (but not necessarily directly to) the AM element. Element (D) may be arranged to overlie an area of the AM element. Said capsule element (D) may be secured to other regions which are arranged to define the capsule by welding. Said capsule element (D) is preferably secured, for example welded, so that a gas tight (e.g. to helium) seal is defined between capsule element (D) and other regions which are arranged to define the capsule to which it is secured.

Capsule element (D) may bridge capsule element (A) and capsule element (B) and, optionally, capsule element (C). Capsule element (D) is preferably secured, for example welded, to capsule element (A) suitably so that a gas tight (e.g. to helium) seal is defined between the two elements. Capsule element (D) is preferably secured, for example welded, to capsule element (B) suitably so that a gas tight (e.g. to helium) seal is defined between the two elements.

Said capsule element (D) may be made from the same material or a different material compared to that of said AM element. Preferably, capsule element (D) is made from a different material compared to that of said AM element.

Said capsule element (D) preferably comprises, more preferably consists essentially of, a metal. Said capsule element (D) may be soluble in a liquid formulation which is contacted subsequently with the combination of AM element and capsule element (D), so that the capsule element (D) can be removed by dissolution. Capsule element (D) may arranged to be sacrificed in the method or may be not removed and left in place. Preferably, however, capsule element (D) is arranged to be sacrificed in the method—that is, it is removed in the method and does not remain in the HIPed component.

Said capsule element (D) preferably comprises, more preferably consists essentially of, a metal, for example selected from mild steel, stainless steel, titanium and aluminium.

Said capsule element (D) preferably comprises a sheet material which is secured relative to the AM element. The sheet material is preferably shaped to define a near net shaped region of the HIPed component. Said capsule element (D), for example said sheet material, preferably has a thickness typically in the range of 2-5 mm, and may have thicker sections to control shape and directional densification.

Step (ii) of the method may include (suitably in addition to selecting capsule element (A), capsule element (B) and, capsule element (D) (at least), selection of a capsule element (E) and preferably securing it to the AM element. Element (E) may be arranged to overlie an area of the AM element. Said capsule element (E) and AM element may be secured to other regions which are arranged to define the capsule by welding. Said capsule element (E) is preferably secured, for example welded, so that a gas tight (e.g. to helium) seal is defined between capsule element (A) and capsule element (D) and between capsule element (B) and capsule element (D).

Capsule element (E) may bridge capsule element (A) and capsule element (B) and, optionally, capsule element (C). Capsule element (E) is preferably secured, for example welded, to capsule element (A) suitably so that a gas tight (e.g. to helium) seal is defined between the two elements. Capsule element (E) is preferably secured, for example welded, to capsule element (B) suitably so that a gas tight (e.g. to helium) seal is defined between the two elements.

Said capsule element (E) may be made from the same material or a different material compared to that of said AM element. Preferably, capsule element (E) is made from a different material compared to that of said AM element.

Said capsule element (E) preferably comprises, more preferably consists essentially of, a metal. Said capsule element (E) may be soluble in a liquid formulation which is contacted subsequently with the combination of AM element and capsule element (E), so that the capsule element (E) can be removed by dissolution. Capsule element (E) may arranged to be sacrificed in the method or may be not removed and left in place. Preferably, however, capsule element (E) is arranged to be sacrificed in the method—that is, it is removed in the method and does not remain in the HIPed component.

Said capsule element (E) preferably comprises, more preferably consists essentially of, a metal, for example selected from mild steel, stainless steel, titanium and aluminium.

Said capsule element (E) preferably comprises a sheet material which is secured relative to the AM element. The sheet material is preferably shaped to define a near net shaped region of the HIPed component. Said capsule element (E), for example said sheet material, preferably has a thickness typically in the range of 2-5 mm, and may have thicker sections to control shape and directional densification.

In a preferred embodiment, said capsule comprises capsule element (A) and capsule element (B) which are spaced apart and capsule element (D) and capsule element (E) which bridge a gap between capsule element (A) and capsule element (B) and, in the method, capsule elements (D) and (E) are welded to both capsule element (A) and capsule element (B) and capsule elements (C) and (D) are welded to one another.

Thus, preferably in step (ii) of the method, individual (and preferably separate) capsule elements (A), (B), (C), (D) and (E) (and, optionally additional capsule elements which are suitably made from a sheet material suitably as described for capsule element (A)) are selected and are positioned around said AM element and are subsequently secured, for example welded, to one another as described.

Preferably, in the method, capsule elements (A), (B), (C), (D) and/or (E) (and, optionally additional capsule elements which are suitably made from a sheet material suitably as described for capsule element (A)), substantially fully enclose and/or encapsulate the AM element. Preferably, capsule elements (A), (B), (C), (D) and/or (E) (and, optionally said additional capsule elements described) are arranged to define a near net shaped outer surface of the HIPed component. Said AM element is preferably arranged to define at least part of a near net shaped inner surface of the HIPed component.

In step (ii) of the method, a capsule is suitably constructed comprising said AM element, with a void suitably being defined around at least part of (preferably substantially the whole of) the AM element. When said capsule comprises capsule element (A), the void may be defined between capsule element (A) and said AM element. The void may be defined at least in part between said AM element and capsule elements (A), (B) and (D), when provided. Said void may be defined between said AM element and capsule elements (A), (B), (C), (D) and/or (E).

Embodiment (A), a specific example of which is described with reference to FIGS. 1 to 6, may include all of the features describe above. In an embodiment (B), a specific example of which is described with reference to FIGS. 7 to 11, fewer of said features may be included.

In said embodiment (B), the method may be as described in said first aspect. In this case, said first region of said capsule may be curved and it preferably curves through an angle of 360°. Said first region suitably has any feature of the first region described above.

Embodiment (B) may not include a second region of said capsule as described above.

Said AM element of embodiment (B) may define a relatively complex shape and/or configuration. It preferably includes a plurality of openings, for example passageways, which may extend around an axis of the AM element.

In said capsule of embodiment (B), said AM element may be as described above (and may be manufactured as described above) for embodiment (A).

In step (ii) of embodiment (B), said method suitably comprises constructing regions of the capsule around said AM element, suitably such that said first region of said capsule is defined by said AM element. Step (ii) of the method may comprise selecting a capsule element (A) (which may be cylindrical) and securing it to (preferably directly to) the AM element. Said capsule element (A) may be arranged to overlie at least part of said AM element. It may be arranged to overlie at least part of the first region of the AM element. Said capsule element (A) and AM element may be secured together by welding. Said capsule element (A) preferably comprises a sheet material which is secured to the AM element. The sheet material is preferably shaped to define a near net shaped region of the HIPed component.

Step (ii) of embodiment (B) of the method may include (suitably in addition to selecting capsule element (A)), selection of a capsule element (B) (which is suitably an end cap which may be planar) and preferably securing it to (preferably directly to) the AM element. Capsule element (B) may be arranged to overlie an extremity of the AM element. It may be arranged to overlie an opening, for example a channel or pipe section of said AM element. Said capsule element (B) and AM element may be secured together by welding.

Said capsule element (B) preferably comprises a sheet material which is secured to the AM element.

Step (ii) of embodiment (B) of the method may include (suitably in addition to selecting capsule element (A) and capsule element (B)), selection of a capsule element (C) (which is suitably an end cap which may be planar) and preferably securing it to (preferably directly to) the AM element. Capsule element (C) may be arranged to overlie an extremity of the AM element. It may be arranged to overlie an opening, for example a channel or pipe section of said AM element. Said capsule element (C) and AM element may be secured together by welding.

In step (ii) of embodiment (B), a capsule is suitably constructed comprising said AM element, with a void suitably being defined around at least part of the AM element. When said capsule comprises capsule element (A), the void may be defined between capsule element (A) and said AM element. The void may be defined at least in part between said AM element and capsule elements (A), (B) and (C).

In step (ii) of the method (which may be applicable to embodiment (A) or embodiment (B)), said capsule is preferably constructed with an opening to provide access from outside the capsule into the capsule for example into a void of the capsule which is suitably defined around the AM element. A pipe may be associated with said opening for delivering solids and/or fluids into the void and/or removing fluids from the void, for example evacuating the void of air.

In a preferred embodiment, step (ii) comprises constructing said capsule by selecting at least three individual and/or separate elements (e.g. capsule elements selected from capsule elements (A) to (E) described for embodiment (A) or elements (A), (B) and (C) of embodiment (B)) which suitably are made from sheet material, for example sheet metal, and arranging said three elements around the AM element to define a capsule with a void defined around the AM element. Preferably a sufficient number of individual and/or separate elements are selected and arranged around the AM element such that the AM element is internal to the other elements of the capsule.

Subsequent to step (ii) and prior to step (iii), said capsule may be tested, suitably to confirm that it is gas-tight. This may comprise introducing, (for example via said opening which is arranged to provide access into the capsule) a gas, for example helium, into the void defined in the capsule and assessing if any of the gas leaks from the capsule.

In a step (iii)* which is suitably subsequent to step (i) and prior to step (iii), a powder is preferably introduced into the capsule, for example into said void defined in the capsule. The powder preferably comprises, more preferably consists essentially of a metal. The metal may be selected from stainless steels including austenitic, ferritic and martensitic grades, duplex and super duplex stainless steels, Ni, Ti and CoCr alloys together with metal matrix/composite alloys. The metal powder is preferably <500 microns in diameter. The metal powder may be filled up to 100% volume of the capsule void. The metal powder is filled into the capsule void and may be vibrated preferably to achieve a known powder fill weight and an optimum powder packing density.

The powder which is introduced may be the same or may have a different identity, for example it is chemically different, compared to the material which makes up the AM element. It preferably has a different identity. The powder may comprise (e.g. as a major amount) a first metal and said AM element may comprise a second metal, wherein suitably said first and second metals are different.

The shape of the outer surface of the capsule after step (ii) may not correspond to and/or may be different compared to the shape of the AM element. Thus, the shape of the outer surface may not be simply configured to clad the AM element with a substantially constant thickness of a layer derived from said powder after step (iii). The capsule may be suitably constructed in step (ii) so that, after step (iii), multiple layers of different thicknesses derived from said powder are defined on the AM element. For example, one region on said AM element may comprise a layer of thickness x, a second region may comprise a layer of thickness of at least 1.2x, a third region may comprise a layer of thickness of at least 2x. Optionally, a fourth region may comprise a layer of thickness 3x or at least 5x.

Subsequent to step (iii)*, the method preferably comprises evacuating the capsule, for example the void defined in the capsule. A vacuum may be drawn in the capsule for example by attachment of a vacuum device to said opening which is arranged to provide access into the capsule. After evacuation of the capsule, the method preferably comprises sealing the capsule, for example closing said opening which is arranged to provide access into the capsule.

Step (iii) preferably comprises placing the capsule in a HIP system and subjecting it to a predetermined pressure (e.g. ranging between 100-200 MPa) and temperature (e.g. ranging between 500-1250° C.) for a predetermined time, for example based on material wall thickness and overall weight of the component.

Step (iii) is preferably undertaken to achieve 100% density of the AM element and powder which is introduced into the capsule.

Thus, the HIPed component is preferably fully dense.

In step (iii), the powder which is introduced suitably diffusion bonds to the metal of the AM element. The bonded metal powder and AM element will have a different microstructure to that of components manufactured using wrought or cast bodies which are coated or weld clad. The metal powder element will be of a fine homogeneous grain size with minimal segregation and the AM element will consist of a finer and less segregated structure than that obtained from conventional processes. There will suitably be no heat affected zone between the metal powder element and AM element as the AM element is joined by a diffusion bonding process.

Subsequent to step (iii), the method preferably comprises placing the capsule in a conventional heat treatment furnace for solution heat treatment followed by aging or precipitation hardening to achieve optimum material properties for the final component.

Subsequent to step (iii) part of the capsule may be removed from the AM element, suitably to leave a HIPed component comprising said AM element and consolidated and HIPed powder which is suitably introduced in step (iii)* as described. Alternatively, the capsule may remain in place to form part of the final component.

Removal of the capsule as aforesaid may be by machining. Advantageously, removal may be by dissolution, for example by use of acid etching. In step (iii), capsule element (A) is preferably removed. In step (iii), capsule elements (A), (B), (C), (D) and/or (E) of embodiment (A) or elements (A), (B) and (C) of embodiment (B) (and, optionally, any additional elements made from a sheet material) are preferably removed. In step (iii), preferably each element of the capsule which is made from a sheet material for example as described for capsule element (A) is removed.

Said HIPed component preferably comprises said AM element and HIPed powder and preferably includes no region defined by sheet material, for example sheet steel.

Suitably, after step (iii), the HIPed component may be subjected to minimal machining. This is possible because the capsule is arranged to produce a near net shape. Preferably, after step (iii), the HIPed component is not subjected to any machining. Preferably, after step (iii), the HIPed component is not subjected to any process which is arranged to change its shape. Preferably, after step (iii), the HIPed component is not subjected to any process which may preferentially remove any part of the HIPed component in preference to any other part of the HIPed component.

After step (iii), an outer part (for example defined by consolidated powder) may be treated, for example machined, to remove an area of the outer part. For example, the area removed may be associated with an opening which is arranged to provide access into the capsule prior to step (iii). Suitably less than 50%, preferably less than 25%, more preferably less than 10% of the outer surface area of the HIPed component is treated, for example machined after step (iii).

After step (iii), the HIPed component may be subjected to a process which treats substantially the entirely of at least the outer accessible surface of the HIPed component in the same manner. For example, the process may comprise a polishing and/or cleaning process.

Although the HIPed component has been described as comprising one AM element, the method could be used to make a HIPed component which includes more than one AM element. For example, two or more AM elements may be incorporated into a capsule, wherein each of said two or more AM elements defines at least part of the capsule.

According to a second aspect of the invention, there is provided a HIPed component made in the method of the first aspect per se.

According to a third aspect there is provided a HIPed component comprising a region (A) defined by an AM element which has been subjected to HIP (wherein preferably said region defines a void) and a region (B) defined by metal powder which has been subjected to HIP, wherein regions (A) and (B) are contiguous at least in part and are suitably diffusion bonded to one another.

The component of the third aspect may have any feature of the HIPed component of the first aspect mutatis mutandis.

According to a fourth aspect of the invention, there is provided a capsule made in a method of the first aspect per se. The capsule may comprise an AM element, wherein a first region of said capsule is defined by said AM element.

Said capsule, said AM element and said first region may have any feature of the aforementioned components described in the first aspect. Said capsule of the fourth aspect may have any feature of the capsule referred to in the first aspect. For example, it may include a second region as described, a void being defined around at least part of the AM element as described; an opening to provide access from outside the capsule into the capsule; at least three individual and/or separate elements, which may be selected from elements (A) to (E) in the first embodiment (A) or elements (A), (B), and (C) of embodiment (B). The capsule may incorporate powder for example provided in the void defined in the capsule and the powder may be as described in accordance with the first aspect. The shape of the outer surface of the capsule may not correspond to and/or may be different compared to the shape of the AM element as described in the first aspect. The capsule may be evacuated as described in the first aspect.

BRIEF DESCRIPTION OF THE DRAWINGS

Specific embodiments of the invention will now be described. By way of example, with reference to the accompanying drawings, in which:

FIG. 7c is a cross-section along line VII-VII of FIG. 7a;

FIG. 8b is a side view of the end cap of FIG. 8a;

In the figures, the same or similar parts are annotated with the same reference numerals.

DETAILED DESCRIPTION OF THE DRAWINGS

Figure 1:
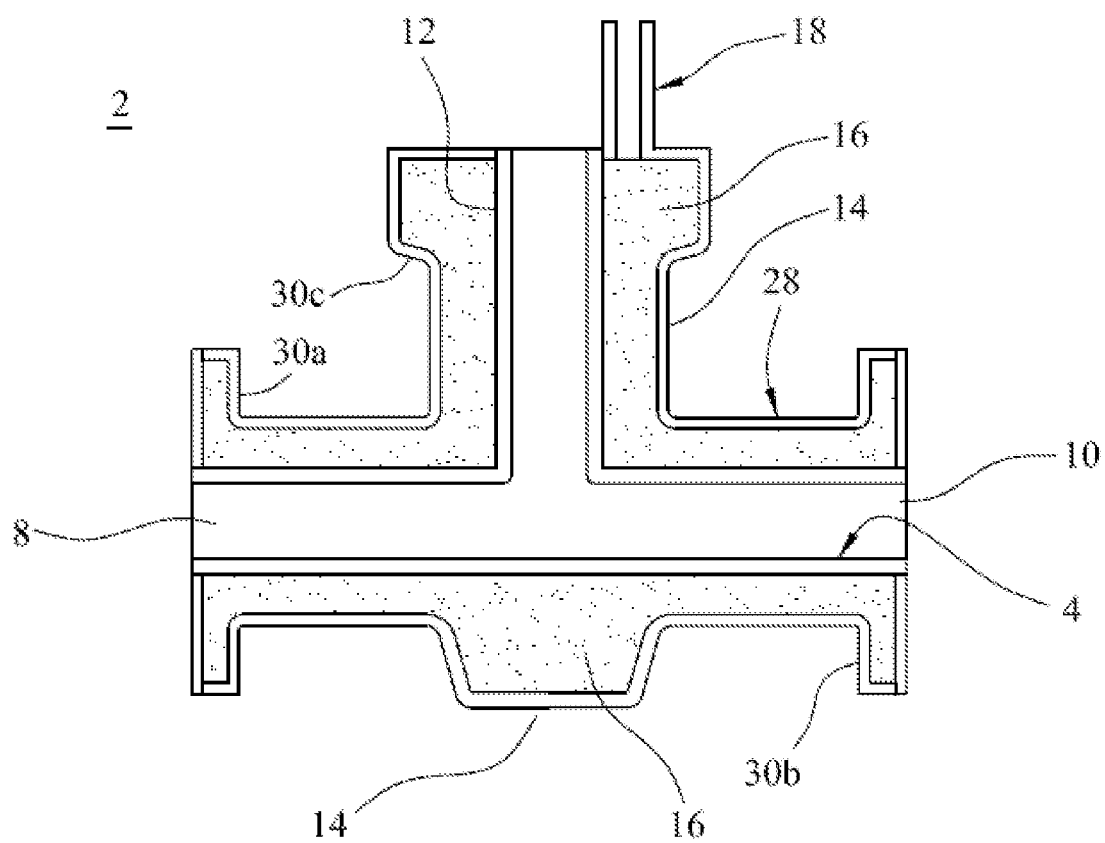
FIG. 1 is a cross-section through an assembly for HIP comprising an AM element forming part of a capsule.
Figure 2:
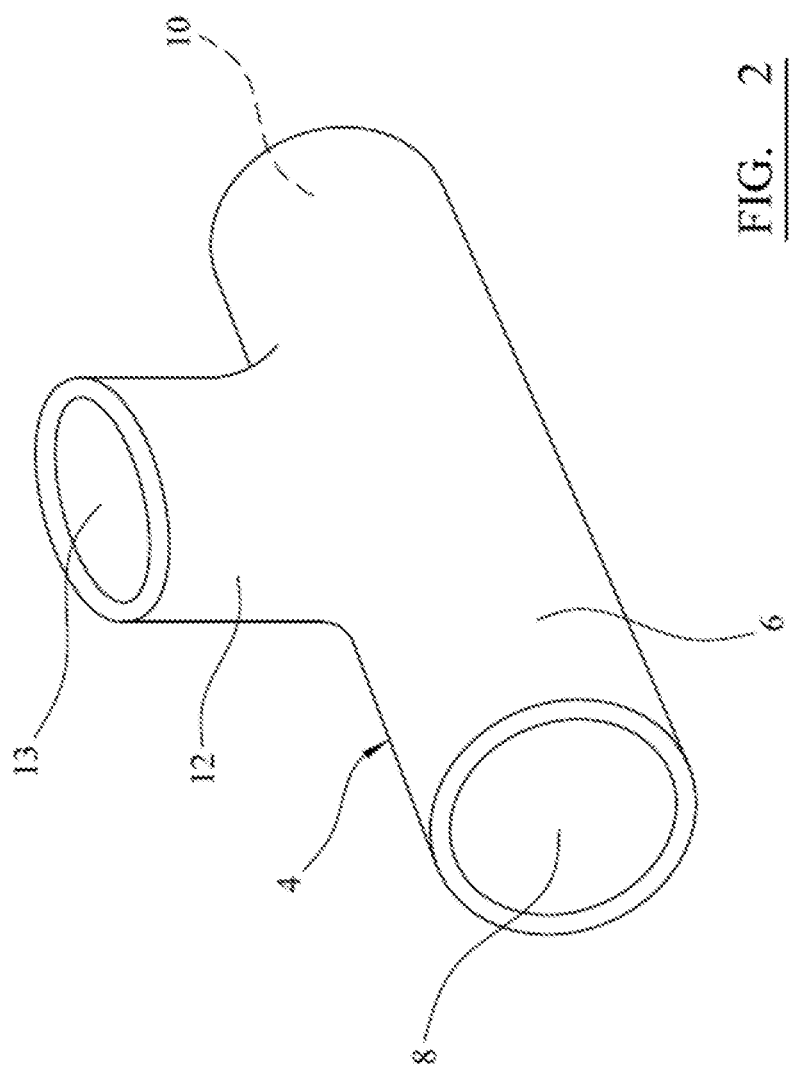
FIG. 2 is a perspective view of an AM element of the assembly of FIG. 1.
Figure 3:
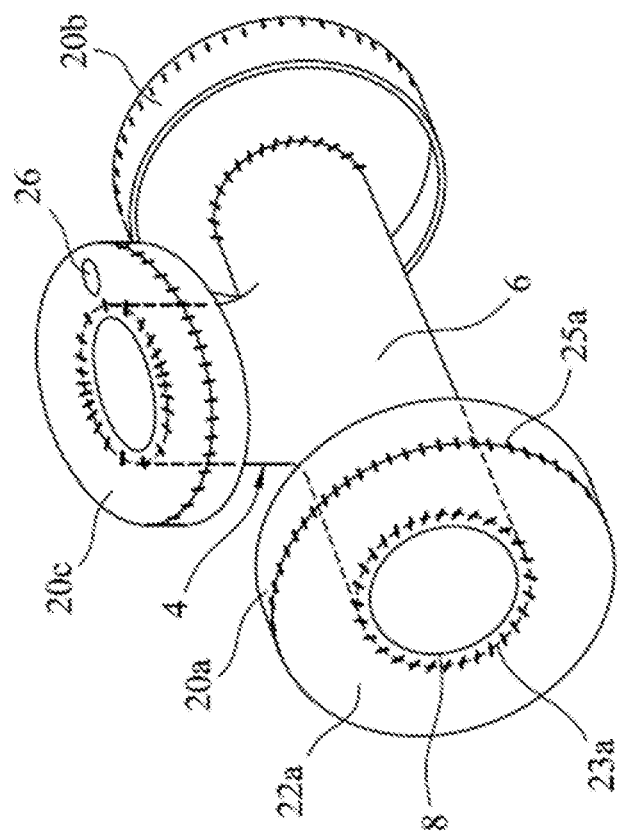
FIGS. 3 to 5 show, in perspective view, stages in the formation of parts of the capsule comprising the AM element.
Figure 5:
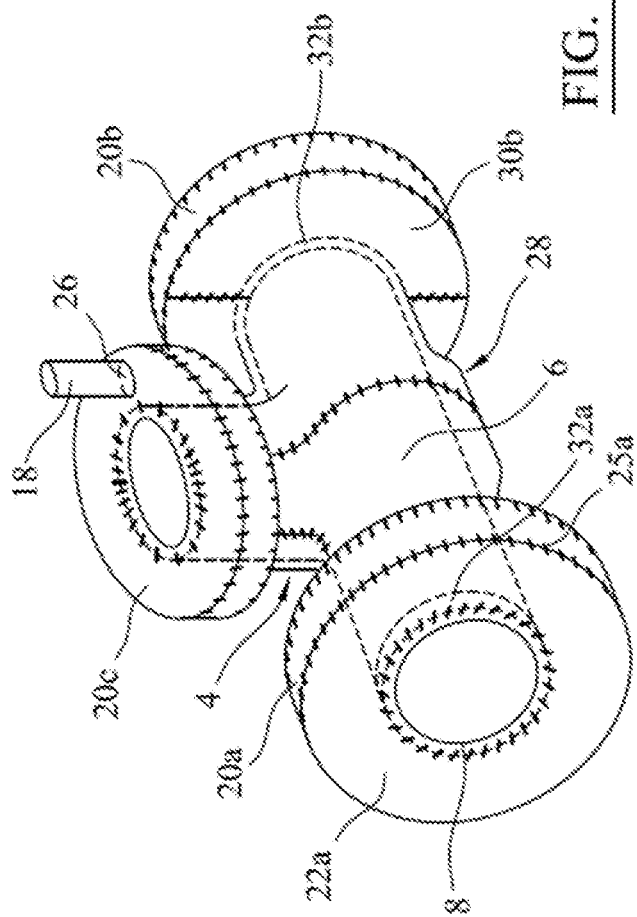
Figure 6:
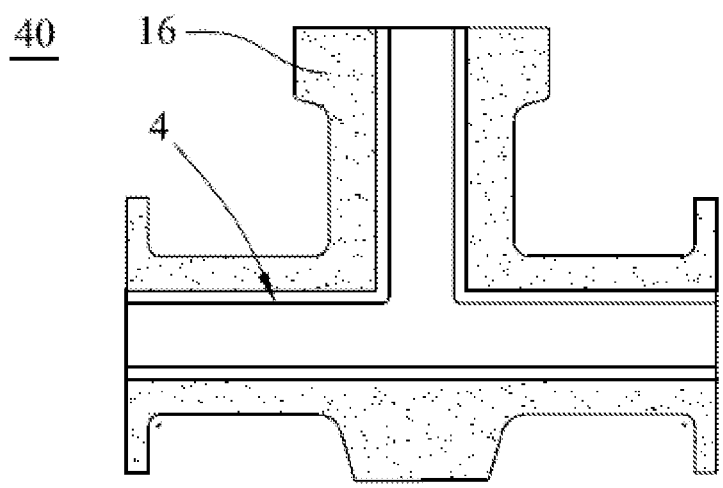
FIG. 6 is a cross-section through a component made using the assembly of FIGS. 1 to 5.

Referring to FIGS. 1 and 2, the assembly 2 comprises a rigid, self-supporting AM component 4 which is in the form of a T-shaped pipe having an elongate section 6 which is open at its ends 8, 10 and a section 12 which extends transversely to elongate section 6 and opens at its end 13. The component 4 forms internal walls of a capsule which is subjected to HIP. External walls of the capsule are defined by sheet metal sections (referenced 14 in FIG. 1 and described in more detail with reference to FIGS. 3 to 5) and are arranged to define the outer shape of at least a portion of a final component made by HIP. Between its inner and outer walls a void is defined into which powdered metal 16 is introduced. Consequently, the capsule encases the powdered metal 16. The assembly 2 includes a pipe 18 providing access from the outside into the area between the inner and outer walls of the capsule. In use, the assembly is subjected to HIP as described below. Thereafter, the sheet metal sections of the capsule are removed to define a final component comprising both the AM component 4 and HIPed powder 16 as shown in FIG. 6.

The assembly 2 and its production are described in more detail below.

The AM component 4 is manufactured using a laser powder bed 3D printing process with a single laser head. The powder used for the build is a stainless steel or a nickel-based alloy. The AM component is designed and the design supplied in a STEP format to allow a CAD model to be produced for programming of the AM build. The AM component is built layer by layer using an optimised build speed to achieve a high density wall free from porosity and defects. After build, the AM component is stress relieved and then removed from the build plate and any support structure removed.

The AM component must be able to be TIG, MIG and/or EBW welded and also compatible for joining by welding to other parts, for example external walls of the capsule.

After its manufacture, the AM component is encased in sheet steel. This is done in stages, to gradually build a sheet steel enclosure around the AM component. Firstly, referring to FIG. 3, sheet steel caps 20a, 20b and 20c are welded to respective ends 8, 10 and 13 of the component 4. Cap 20a comprises a planar circular disc 22a which makes face to face contact with end 8 of component 4 and is welded thereto as represented by weld lines 23a. The cap 20a includes a short, endless skirt which extends perpendicularly from the edge of the disc and is welded thereto as represented by weld lines 25a. Caps 20b and 20c are arranged generally as described for cap 20a except cap 20c includes an opening 26 which is arranged to cooperate with pipe 18 (FIG. 1) for providing access into the capsule when fully assembled.

Figure 4:
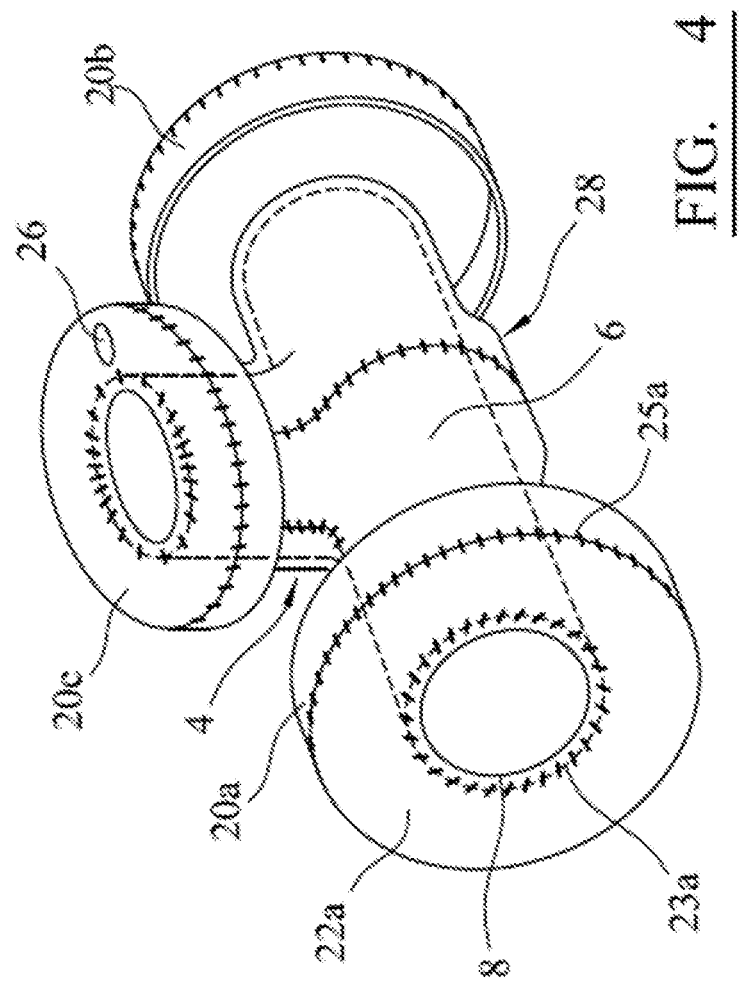

Next, referring to FIG. 4, a main body section 28, of a desired shape, which is made from welded steel sections, is arranged between the caps 20a, 20b and 20c. As shown in FIG. 5, the section 28 is welded to the caps 20a, 20b and 20c by respective closure plates 30a, 30b and 30c (only 30b is clearly shown in FIG. 5) which include flanges (FIG. 5 shows flanges 32a and 32b; the corresponding flange associated with cap 20c is not shown). Finally, pipe 18 is secured within opening 26 by welding.

The sheet steel used to encase the AM component is selected from mild steel, stainless steel, titanium and aluminium.

After construction of the capsule of FIG. 5, it is evacuated by connecting a vacuum line to pipe 18 and then is subjected to helium leak testing to ensure it is gas-tight. Next, it is filled with powdered metal via pipe 18. The powdered metal is selected from stainless steels including austenitic, ferritic and martensitic grades, duplex and super duplex stainless steels, Ni, Ti and CoCr alloys together with metal matrix/composite alloys. The metal powder may be filled up to 100% volume of the capsule void. The powder fill weight is calculated based on the capsule design and the particle size distribution of the metal powder. The metal powder is filled into the capsule void and may be vibrated preferably to achieve a known powder fill weight and an optimum powder packing density.

After filling of the capsule, the assembly 2 is evacuated of entrapped air by connecting a vacuum line to pipe 18 and pulling a vacuum. Then, pipe 18 is crimped to seal the assembly.

Next, the assembly is subjected to HIP by placing it in a HIP system and subjecting it to a predetermined temperature and pressure for a predetermined time. The HIP temperature must be suitable for both the metal powder and material from which the AM component is made and is usually driven by the material (e.g. alloy) with the lowest solidus temperature.

After HIP, the capsule is placed in a heat treatment furnace for a predetermined temperature for a predetermined time in order to achieve optimum material properties for the final component.

After HIP, parts of the capsule which are not to be included in the final component may be removed. This may be done by immersion of the post-HIPed assembly in various acids and stages for a suitable time to dissolve away the sheet steel which encases the component.

After HIP, the final component may be subject to machining to achieve the final component shape.

A finished component 40 shown in FIG. 6 is produced. This comprises the AM component 4 which is fully dense by virtue of it having been HIPed and consolidated powdered metal 16 which is also fully dense by virtue of it having been HIPed. The AM component and consolidated powdered metal are diffusion bonded to one another by virtue of the HIP process. The metallic or bi-metallic component produced has no porosity or defects. The consolidated powdered metal part will have a fine homogenous grain size and the AM component will consist of a very fine grained structure that will be homogenised and reveal less segregation than the as built condition due to the solution treatment of the AM element during the HIP cycle. The joining of the AM component to the powder component takes place by diffusion bonding of the powder particle surfaces to the AM component without any melting or liquid phases which eliminates the presence of a heat affected zone this being replaced by a thin 10-50 micron diffusion zone between the powder and the AM component.

Figure 7A:
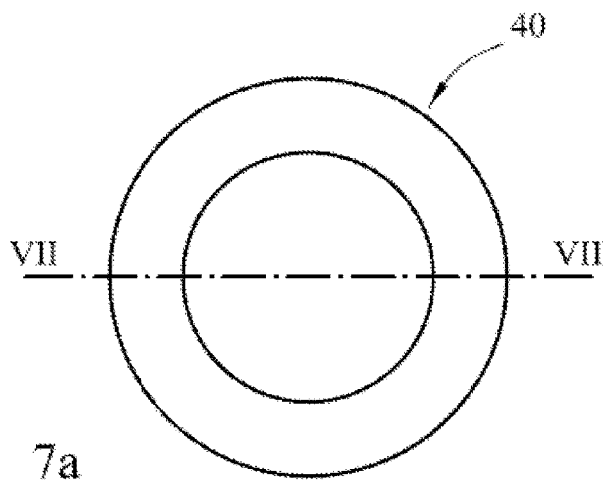
FIG. 7a is a top plan view (an underneath plan view is identical) of an AM element for a high pressure cylinder.
Figure 7B:
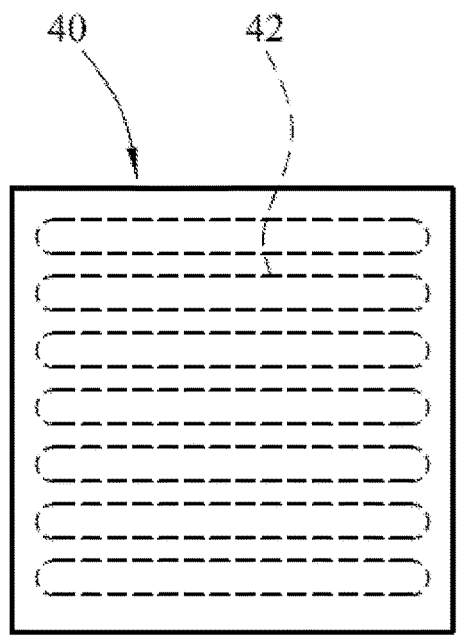
FIG. 7b is a side elevation, partly in cross-section, of the AM element, to show cooling galleries of the AM element.
Figure 7C:
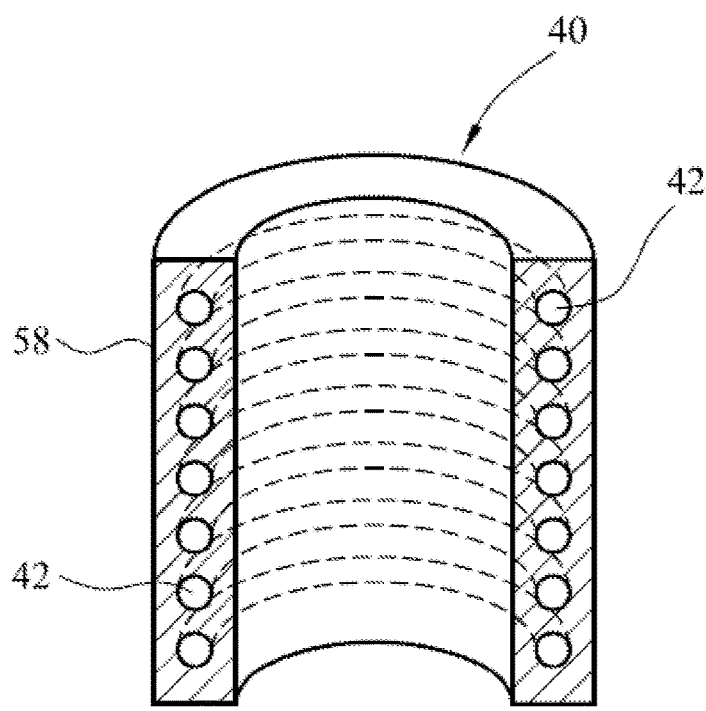
Figure 8A:
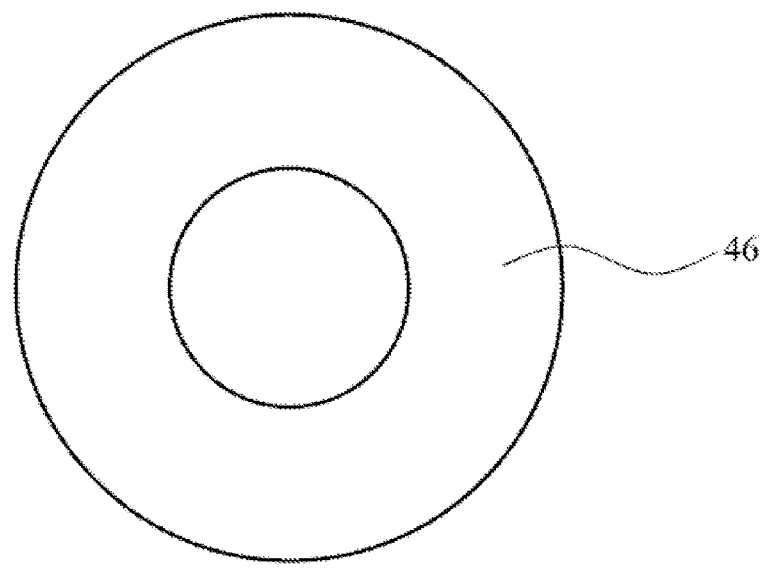
FIG. 8a is a top plan view of a top end cap for a capsule (a bottom end cap of the capsule is identical)
Figure 8B:
Figure 8C:
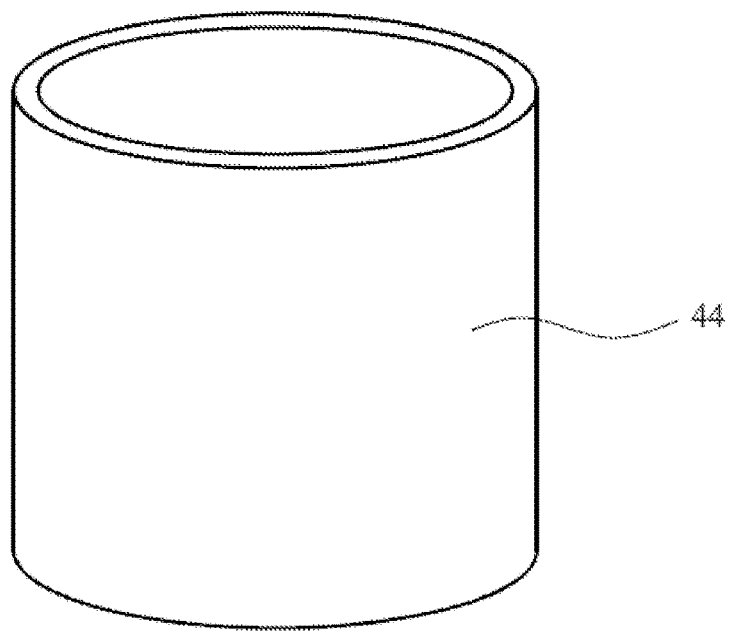
FIG. 8c is a side view of a cylindrical outer wall for the capsule.

Referring to FIGS. 7a to 7c, AM component 40 is manufactured generally as described for the AM component 4 referenced above. The component 40 comprises spirally arranged cooling galleries 42 defined in the mass of the component 40 which is made from a suitable wear resistant material.

Figure 9:
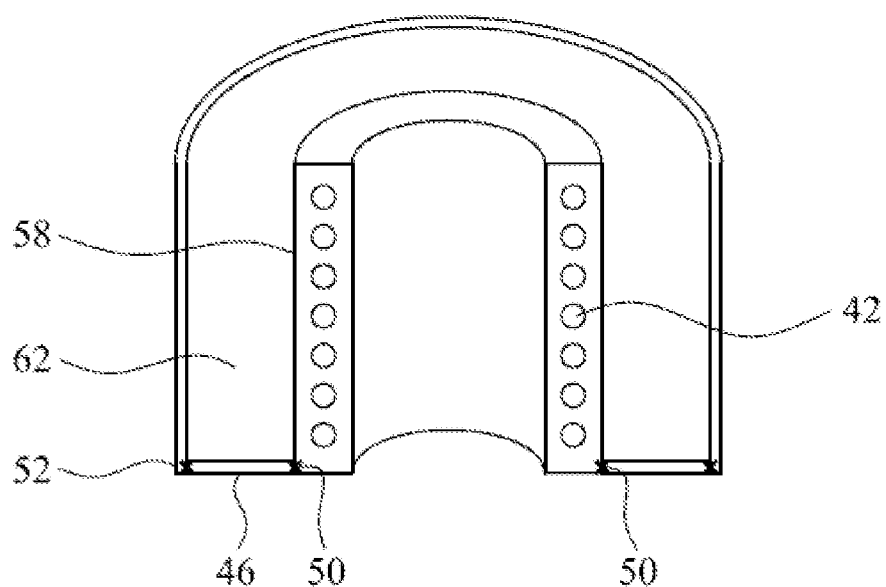
FIG. 9 is a cross-section through an assembly comprising the AM element of FIG. 7 and parts of a capsule, namely the cylindrical outer wall of FIG. 8c and the bottom end cap of FIGS. 8a/8b (the top end cap has been omitted in the interests of clarity)
Figure 10A:
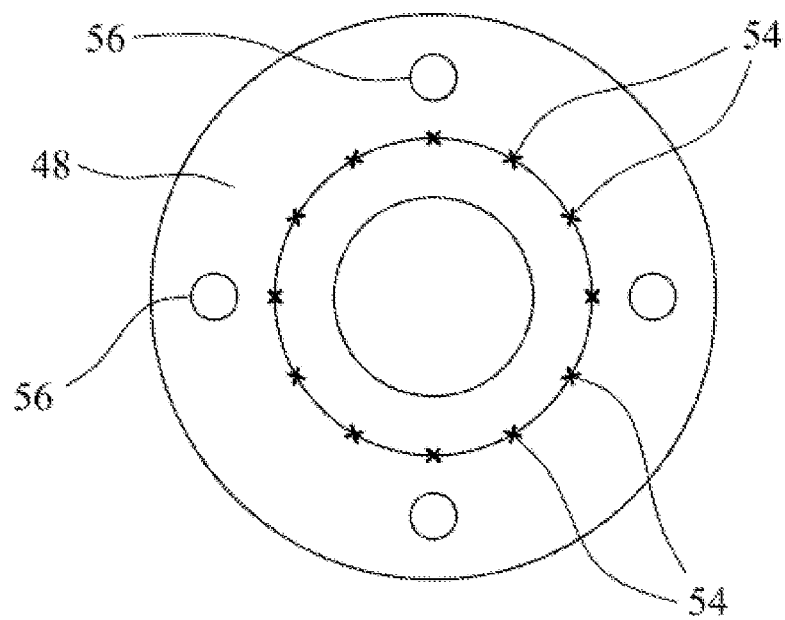
FIG. 10a is a top plan view of the capsule of FIG. 9, but showing the top end cap welded to the AM element.
Figure 10B:
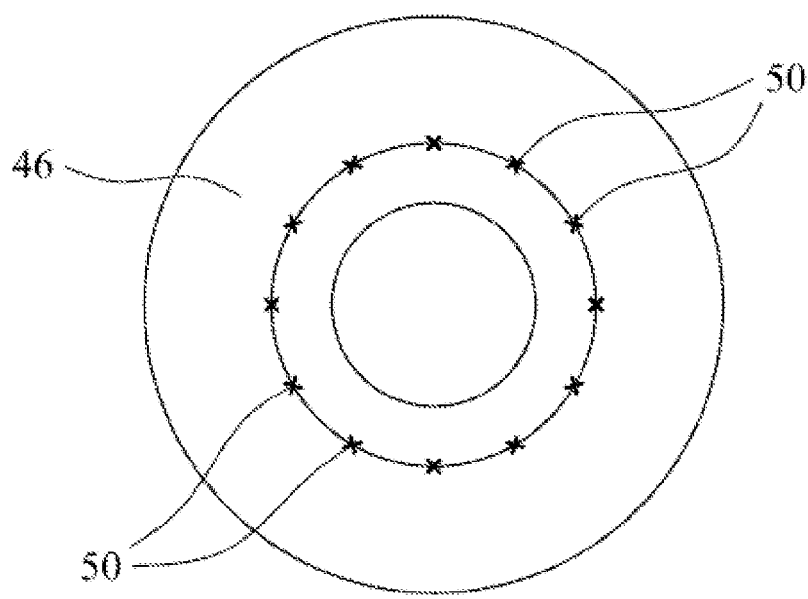
FIG. 10b is an underneath plan view of the capsule of FIG. 9 showing the bottom end cap welded in position.

After its manufacture, the AM component 40 is encased in sheet steel. To this end, outer steel cylindrical wall 44 and a pair of end caps 46, 48 are welded to AM component 40 as shown in FIGS. 9 and 10. More particularly, lower annular end cap 46 is TIG welded at positions 50 to the outer wall of AM component 40. An outer periphery of end cap 46 is TIG welded to a lower end 52 of cylindrical wall 44. Although not shown in the figures (except FIG. 10a), the upper annular end cap 48 is welded at positions 54 to the outer wall of the AM component at an upper end thereof. When the end caps 46, 48 and wall 44 are welded in position, the end caps and wall, together with an outer wall 58 of the AM component, define void 62 which can be filed with powder.

Figure 11:
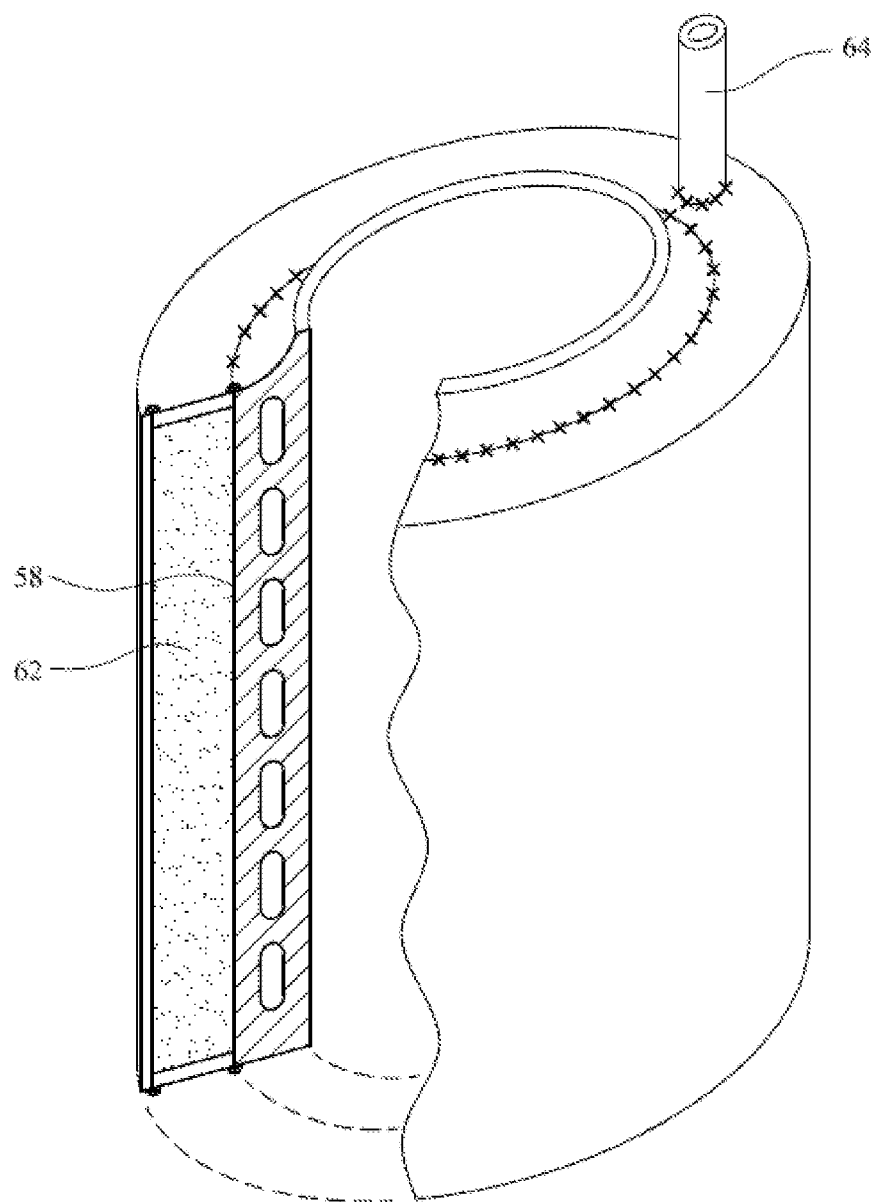
FIG. 11 is a perspective view, partly cut-away, showing the assembly comprising the AM element and capsule of FIGS. 7 to 10 with a void being filled with powder, ready for the assembly to be subjected to HIP.

End cap 48 includes holes 56 which are arranged to allow powder to be introduced into the void 62. The number of holes 56 may vary and such holes 56 may be engaged with fill tubes 64 (FIG. 11) to facilitate introduction of the powder into the void defined by the capsule comprising end caps 46, 48, cylindrical wall 44 and the outer wall of the AM component.

After filling of the void with powder, the assembly may be subjected to HIP and/or other processes as described for the embodiment of FIGS. 1 to 6.

After HIP and removal of the sheet steel, a high pressure cylinder for use in a hydraulic or gas compressor is suitably defined, with the cooling galleries being arranged to carry a cooling fluid.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of producing hot isostatic pressed (HIPed) component comprising at least one void, the method comprising:
   (i) selecting an additive manufactured (AM) element comprising the void;
   (ii) constructing a capsule which is arranged to define at least part of said HIPed component, wherein a first region of said capsule is defined, at least in part, by said AM element; and
   (iii) subjecting the capsule to HIP;

wherein step (ii) of the method comprises selecting a capsule element (A) and securing it to the AM element by welding, wherein said capsule element (A) comprises a sheet material and said sheet material is shaped to define a near net shaped region of the HIPed component;

wherein powder is introduced into the capsule subsequent to step (i) and prior to step (iii); and wherein subsequent to step (iii) part of the capsule is removed from the AM element, to leave a HIPed component comprising said AM element, said void in the AM element and consolidated and HIPed powder.

2. The method according to claim 1, wherein said first region of said capsule is curved and preferably includes a surface which curves through an angle of at least 30° or at least 180° or 360°.

3. The method according to claim 1, wherein said first region of said capsule defines an internal wall of said capsule and/or said first region of said capsule does not include any surface which is part of an outer surface of the capsule.

4. The method according to claim 1,
wherein, in step (ii) of the method, the capsule is constructed comprising said AM element (Para 0007),
with the capsule void being defined around substantially the whole of the AM element for receiving said powder into the capsule subsequent to step (i) and prior to step (iii).

5. The method according to claim 1, wherein the at least one void of the AM element is a through passage in the AM element, which extends from a first position on the AM element to a second position on the element.

6. The method according to claim 5, wherein said AM element includes a plurality of openings.

7. The method according to claim 1, wherein a second region of said capsule is defined, at least in part, by said AM element, wherein said second region of said capsule is curved and preferably includes a surface which curves through an angle of at least 30° or at least 180° or 360°.

8. The method according to claim 7, wherein said second region of said capsule defines an internal wall of said capsule and/or said second region of said capsule does not include any surface which is part of an outer surface of the capsule.

9. The method according to claim 8, wherein said second region of said capsule defines a void.

10. The method according to claim 1, wherein said first region of said capsule extends around an elongate axis which extends in a first direction and a or said second region of said capsule extends around an elongate axis which extends in a second direction, wherein said first and second directions extend transversely to one another, for example at an angle of at least 20° or of about 90° to one another.

11. The method according to claim 10, wherein said AM element includes an opening which extends from a first position on the AM element to a second position on the element, with the at least one void of the AM element being defined between the first and second positions; and said AM element includes a second void between third and fourth positions, wherein said third and fourth positions are spaced from said first and second positions.

12. The method according to claim 10, wherein, in said capsule, said AM element does not include any surface which is part of an outer surface of the capsule.

13. The method according to claim 12, wherein said AM element is able to hold a gas tight seal and retain such gas tight seal during HIP.

14. The method according to claim 12, wherein said AM element is weldable to other regions of said capsule which are not defined by said AM element.

15. The method according to claim 12, wherein said AM element represents 10-60%, for example 10-40% or 20-40%, of the total volume of the HIPed component.

16. The method according to claim 12, wherein said capsule element (A) is arranged to overlie a channel or pipe section of said AM element.

17. The method according to claim 12, wherein step (ii) of the method comprises selecting a capsule element (B) and securing it to the AM element by welding, wherein capsule element (A) and capsule element (B) are spaced apart, wherein said capsule element (B) comprises a sheet material and said sheet material is shaped to define a near net shaped region of the HIPed component.

18. The method according to claim 17, wherein said capsule element (B) is arranged to overlie a channel or pipe section of said AM element.

19. The method according to claim 18, wherein step (ii) of the method comprises selecting a capsule element (C) and securing it to the AM element by welding, wherein capsule element (C) is spaced apart from capsule element (A) and capsule element (B), wherein capsule element (C) comprises a sheet material and said sheet material is shaped to define a near net shaped region of the HIPed component.

20. The method according to claim 19, wherein the capsule is constructed in step (ii) so that, after step (iii), multiple layers of different thicknesses derived from said powder are defined on the AM element.

21. The method according to claim 20, wherein one region on said AM element comprises a layer of thickness x, a second region comprises a layer of thickness of at least 1.2x and a third region comprises a layer of thickness of at least 2x.

22. The method according to claim 21 wherein step (ii) of the method includes selection of a capsule element (D) and securing it relative to the AM element, wherein capsule element (D) is welded to capsule element (A) so that a gas tight seal is defined between the two elements and optionally capsule element (D) is welded to a or said capsule element (B).

23. The method according claim 22, wherein step (ii) of the method includes, in addition to selecting a or said capsule element (A) and a or said capsule element (B), selection of a capsule element (D) and securing it relative to the AM element, wherein element (D) is arranged to overlie an area of the AM element, wherein capsule element (D) bridges capsule element (A) and capsule element (B) and is welded to capsule element (A) so that a gas tight seal is defined between capsule element (A) and capsule element (D).

24. The method according to claim 23, wherein said capsule comprises capsule element (A) and capsule element (B) which are spaced apart and capsule element (D) and capsule element (E) which bridge a gap between capsule element (A) and capsule element (B) and, in the method, capsule elements (D) and (E) are welded to both capsule element (A) and capsule element (B) and capsule elements (C) and (D) are welded to one another.

25. The method according claim 24, wherein in step (ii) of the method, individual capsule elements (A), (B), (C), (D) and, optionally, capsule element (E), each being made from sheet material, are selected, positioned around said AM element and secured relative to one another.

26. The method according to claim 1, wherein step (ii) comprises constructing regions of the capsule around said AM element such that said first region of said capsule is defined by said AM element; selecting a capsule element (A) and securing it to the AM element, wherein said capsule element (A) and AM element are secured together by welding; and selection of a capsule element (B) and securing it to the AM element, wherein capsule element (B) is arranged to overlie an opening, for example a channel or pipe section of said AM element, wherein said capsule element (B) and AM element are secured together by welding.

27. The method according to claim 1, wherein step (ii) of the method includes selection of a capsule element (C) (which is suitably an end cap which may be planar) and securing it to the AM element.

28. The method according to claim 1,
wherein in step (ii) of the method, the capsule is constructed comprising said AM element, with the void being defined around at least part of the AM element and said capsule is constructed with an opening to provide access from outside the capsule into said void, for receiving said powder into the capsule subsequent to step (i) and prior to step (iii).

29. The method according to claim 1, wherein step (ii) comprises constructing said capsule by selecting at least three individual and/or separate elements which are made from sheet metal, and arranging said three elements around the AM element to define a capsule with a void defined around the AM element, for receiving said powder into the capsule subsequent to step (i) and prior to step (iii), and a sufficient number of individual and/or separate elements are selected and arranged around the AM element such that the AM element is internal to the other elements of the capsule.

30. The method according to claim 1, wherein in step (iii) metal powder is filled into the capsule void and is vibrated, for example to achieve a known powder fill weight and an optimum powder packing density.

31. The method according to claim 1, wherein the shape of the outer surface of the capsule after step (ii) does not correspond to and/or is different compared to the shape of the AM element.

32. The method according to claim 1, wherein step (iii) comprises placing the capsule in a HIP system and subjecting it to a predetermined pressure and temperature for a predetermined time.

\* \* \* \* \*